United States Patent [19]
Collette et al.

[11] 3,856,765

[45] Dec. 24, 1974

[54] FUNCTIONALLY SUBSTITUTED TERPOLYMERS OF ALPHA-OLEFINS

[76] Inventors: John Wilfred Collette, 1235 Faun Road Graylyn Crest; Rolland Shih-Yuan Ro, 1208 Lakewood Dr.; Fred Max Sonnenberg, 1423 Carson Rd., Green Acres, all of Wilmington, Del. 19803

[22] Filed: Apr. 27, 1973

[21] Appl. No.: 355,010

Related U.S. Application Data

[62] Division of Ser. No. 829,758, June 2, 1969, Pat. No. 3,796,687.

[52] U.S. Cl. ........ 260/80.73, 260/47 UA, 260/63 R, 260/63 BB, 260/79.3 MU, 260/80.75, 260/80.78
[51] Int. Cl. ............................................ C08f 15/40
[58] Field of Search ...................... 260/80.73, 80.78

[56] References Cited
UNITED STATES PATENTS

| 3,481,908 | 12/1969 | Mortimer | 260/80.73 |
| 3,492,277 | 1/1970 | Clark | 260/88.1 |
| 3,551,524 | 12/1970 | Stein | 260/880 |
| 3,687,909 | 8/1972 | Vaughn | 260/80.78 |
| 3,723,399 | 3/1973 | Amiard et al. | 260/80.73 |
| 3,796,687 | 3/1974 | Collette et al. | 260/47 UA |

*Primary Examiner*—Lester L. Lee

[57] ABSTRACT

Addition terpolymers of ethylene with an $\alpha$-olefin and an unsaturated, functionally substituted monomer. Addition tetrapolymers of ethylene with an $\alpha$-olefin having 3–18 carbon atoms, a nonconjugated diene having only one polymerizable double bond, and an unsaturated, functionally substituted monomer. A process for preparing copolymers of ethylene with an unsaturated functionally substituted monomer, and optionally also with at least one of the following: an $\alpha$-olefin having 3–18 carbon atoms and a nonconjugated diene having only one polymerizable double bond; wherein the monomers are contacted in the presence of a vanadium compound soluble in hydrocarbons and chlorinated hydrocarbons, in which vanadium is in the oxidation state of at least +3, an organoaluminum compound, and an organic compound having at least one carbon atom substituted by three halogen atoms which can be chlorine or bromine.

1 Claim, No Drawings

FUNCTIONALLY SUBSTITUTED TERPOLYMERS OF ALPHA-OLEFINS

BACKGROUND OF THE INVENTION

This is a Division of application Ser. No. 829,758, filed June 2, 1969 and now U.S. Pat. No. 3,796,687.

This invention relates to a new copolymerization process and to new terpolymers and tetrapolymers having functional groups which can be obtained thereby.

It is well known to copolymerize certain olefinic and vinyl monomers in the presence of free-radical generating initiators. Some olefinic monomers, such as propylene, isobutylene, and butene either cannot be polymerized at all in the presence of free-radical initiators or can be polymerized only to low molecular weight polymers. Polymerization of diolefins or divinyl compounds by a free radical process leads to highly crosslinked polymers which are of limited practical value.

coordination catalysts, which allow a much better control of the polymerization process, often are not suitable for use with monomers having functional groups containing elements other than carbon and hydrogen. Usually, coordination catalysts tend to complex with polar functional groups and such complexed catalysts either become completely deactivated or decay at a fast rate.

Copolymers of olefinic monomers with several monomers containing functional groups have been reported. Terpolymers of ethylene with propylene and certain unsaturated acid amides, nitriles, anhydrides, and esters have also recently been described in U.S. Pat. No. 3,278,495. However, neither terpolymers of ethylene and α-olefins with monomers containing other functional groups nor tetrapolymers of ethylene with α-olefins, dienes and functional monomers are known.

SUMMARY OF THE INVENTION

Accordingly, it has now been discovered that novel elastomeric ethylene random terpolymers with α-olefins having 3–18 carbon atoms and unsaturated functional monomers and of tetrapolymers with nonconjugated dienes having only one polymerizable double bond can be readily made using a coordination catalyst based on a vanadium compound, in which the vanadium is in the oxidation state of +3 or higher. Random distribution of the monomer units in a terpolymer or tetrapolymer molecule is often useful for good elastic properties of the material. An aluminum aryl or alkyl or an aryl- or alkylaluminum chloride or bromide also is present. When the functional groups of the monomer contain either oxygen or nitrogen, the molar concentration of the organoaluminum compound is at least equal to that of the functional monomer. Reduced vanadium is regenerated by an oxidizing agent which is preferably an organic compound having at least one carbon atom substituted by three halogen atoms selected from chlorine and bromine. The copolymerization is run in solution in an organic solvent.

The following monomers having functional groups can be copolymerized with ethylene and optionally also with an α-olefin, a nonconjugated diene, or both, by the process of the present invention:

1. Compounds of the formula I $$CH_2=CH-(CH_2)_m-X \quad m = 2-20 \qquad \text{I}$$

where X can be one of the following groups:

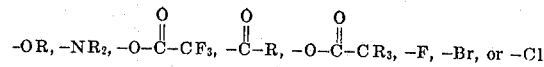

and R can be alkyl, aryl, or cycloalkyl containing 1–18 carbon atoms, or hydrogen;

2. Compounds of formula II $$CH_2=CH-(CH_2)_nY \quad n = 0-20 \qquad \text{II}$$

where Y can be one of the following groups:

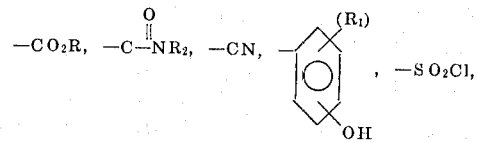

where R can be alkyl, aryl or cycloalkyl, containing 1–18 carbon atoms, or hydrogen; $R_1$ can be either R or OR.

3. Compounds of the formula III

where Z can be either X or Y; and

4. Compounds of the formula IV

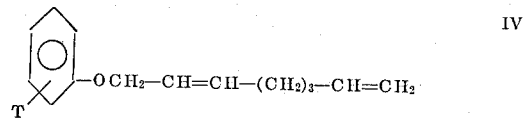

where T can be hydrogen, —OH, $C_1$–$C_{18}$ alkyl, $C_1$–$C_{18}$ alkoxy, or a halogen.

Tetrapolymers made with all the above functional monomers are new compositions of matter. Certain terpolymers prepared by the process of this invention also are new to the art. They include terpolymers of ethylene with an α-olefin and a functional monomer which can be represented by one of the following formulas V through XIV:

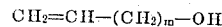   V

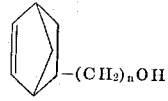   VI

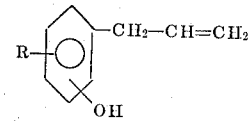   VII

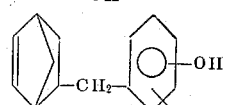   VIII

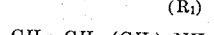   IX

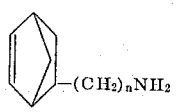   X

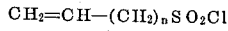   XI

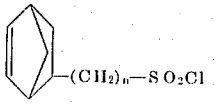   XII

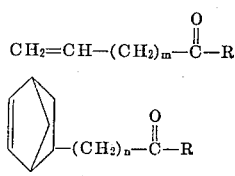

$$CH_2=CH-(CH_2)_m-\overset{O}{\underset{\|}{C}}-R \qquad \text{XIII}$$

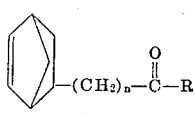

where $R$, $R_1$, m and n have the same meaning as in formulas I–IV, above; these functional monomers all are derived from, and are special cases of, the broader classes of monomers represented by formulas I–III.

DETAILED DESCRIPTION OF THE INVENTION

Copolymerization of ethylene with a functionally substituted monomer — optionally also with an α-olefin, a nonconjugated diene, or both — can be run either batchwise or continuously, at either atmospheric or superatmospheric pressure. A solvent usually is employed, although it is not absolutely necessary. Good solvents are aliphatic hydrocarbons such as pentane, hexane, heptane, octane, and isooctanes; cycloaliphatic hydrocarbons, such as cyclopentane, cyclohexane, cycloheptane, and cyclooctane; and halogenated aliphatic hydrocarbons, for example, perchloroethylene, carbon tetrachloride, methylene chloride, and chloroform.

The reaction catalyst is composed of the following constituents:

a. A vanadium compound in which vanadium is in an oxidation state of +3 or higher; for example, $VCl_4$, $VOCl_3$, vanadium tris(acetylacetonate); vanadium halide complexes with ethers, amines, or phosphines (for example complexes of $VCL_3$ with dioxane, pyridine or triphenylphosphine); and esters and haloesters of vanadic acids (such as diethoxyvanadium dichloride, triethyl vanadate, or diethoxyvanadium oxychloride). The vanadium compound should be soluble in hydrocarbons and chlorinated hydrocarbons.

b. An organoaluminum compound of the structure $(R_2)_3AL$, $(R_2)_3Al_2L_3$, $(R_2)_2AlL$, or $(R_2)AlL_2$, where $R_2$ is aryl or a $C_1$–$C_6$ alkyl, such as methyl, ethyl, propyl, isopropyl, butyl, isobutyl, pentyl, or hexyl; and L is chlorine or bromine.

Representative organoaluminum compounds include: triisobutylaluminum, diisobutylaluminum monochloride, triethylaluminum, diethylaluminum chloride, ethylaluminum sesquichloride, diethylaluminum bromide, ethyaluminum dichloride, propylaluminum dibromide, and triphenylaluminum.

c. A halogenated compound of the general formula $DCL_3$ where L has the same meaning as above, while D can be hydrogen, chlorine, bromine, alkyl, aryl, haloalkyl, haloaryl, carboxyl, alkoxycarbonyl, aryloxycarbonyl, alkylcarbonyl, arylcarbonyl, alkoxy, aryloxy, haloalkoxycarbonyl, haloaryloxycarbonyl, haloalkylcarbonyl, haloarylcarbonyl, haloalkoxy, haloaryloxy, or the group

where A, $A_1$ and $A_2$ each can independently be a halogen, alkyl, haloalkyl, aryl, haloaryl; and A also can be hydrogen.

Representative halogenated compounds are, for example, chloroform, bromoform, carbon tetrachloride, α,α, α-trichloro-toluene, α,α, α-tribromotoluene, trichloroacetic acid, tribromoacetic acid, perchloropropylene, hexachloroacetone, ethyl trichloroacetate and ethyl tribromoacetate.

Normally, at least two moles of organoaluminum compound are present for each mole of vanadium compound. However, the preferred ratio is about 10:1 or more. Organoaluminum compounds required in this process are decomposed in the presence of monomers having active hydrogen atoms, such as carboxylic acids or alcohols. Furthermore, they are complexed and deactivated by oxygen- and nitrogen-containing polar groups. It is, therefore, advantageous to have in the mixture a sufficient amount of the organoaluminum compound to at least compensate for its decomposition or deactivation. An excess of the organoaluminum compound is not harmful, and molar ratios of aluminum to vanadium compounds as high as 200:1 or more can be present in the catalyst.

The halogenated compound $DCL_3$ acts as a catalyst reactivator and it can be present in a large excess, for instance, in an amount of 10 moles per mole of vanadium compound. However, the amount of the reactivator should be kept within the range of about 0.01–1 mole per mole of the organoaluminum compound present in solution. Below the lower limit the reactivation of the vanadium catalyst is not quite efficient, while above the upper limit there is a risk that polymerization may proceed by an undesirable ionic mechanism. The vanadium compound is present in catalytic amounts only, for example, 0.00005–0.005 mole per mole of total unsaturated monomers.

The practical concentration ranges of the essential compounds in the present copolymerization process are tabulated below:

TABLE I

| Compound | Concentration moles/l. | Remarks |
|---|---|---|
| Vanadium catalyst | 0.0000–0.001 | |
| Functional monomer | 0.0001–0.1 | |
| Organoaluminum compound | 0.001–0.1 | must be at least equal to the concentration of oxygen- and nitrogen-containing groups |
| Catalyst reactivator | 0.00001–0.1 | must be at least equal to vanadium catalyst concentration |

Polymerization is run in the absence of moisture in an inert atmosphere, for example in dry nitrogen, and at a temperature of −20° to 125°C. The preferred temperature range is 0–65°C. Below 0°C. it is both inconvenient and expensive to remove heat evolved during the polymerization. Above about 65°C. the molecular weight of the copolymer product can fall below a desirable value. It is usually convenient to carry out the copolymerization at atmospheric pressure, but reasons of economy of time or equipment any sometimes favor closed system polymerizations at autogenous pressures or higher. It is usually possible, for example, to increase the monomer concentration in solution in a closed system; and a smaller reactor, therefore, can be used than at atmospheric pressure. When polymerization is run in a closed system, pressures up to about 10,000 psig. can be used, but it is not practical to exceed a pressure of about 5000 psig.

Although the process of the present invention is susceptible to changes and variations without departing from the spirit of the invention concept, a typical batchwise atmospheric pressure copolymerization involves the following steps: ethylene, and optionally a comonomer α-olefin, are dissolved in an appropriate solvent such as perchloroethylene, and an alkylaluminum compound is added. This is followed by addition of an unsaturated functional monomer, optionally a diene, then a catalyst reactivator and finally, a vanadium compound. The solution is stirred for about 30 minutes, while ethylene and any gaseous monomers are continuously swept through it. The polymerization is stopped by destroying the catalyst system, for example by adding an alcohol. The reaction time in some cases may be as short as 1 minute, while in other cases a period of 2 hours or more may be required to obtain satisfactory yields of the copolymer.

The process of the present invention can also be operated in a continuous manner. It often is desirable in such a case to increase the reaction pressure in order to reduce the residence time. The reactor effluent is continuously removed.

The product copolymer can be isolated by several known techniques, but it is preferred to precipitate it with a non-solvent such as methanol and to wash it. The functional groups of a crude copolymer often retain residual aluminum compounds, and, since a copolymer containing residual aluminum is unsuitable for most applications, removal of any aluminum compounds present is advisable. Where a copolymer is precipitated from solution with an alcohol, it usually is sufficiently free from aluminum, but when the copolymer contains carboxylic groups, it may be necessary to remove the last traces of aluminum compounds, for example by a treatment with trifluoroacetic acid. When other isolation methods are used, for example evaporation or phase decantation, it is practical to remove residual aluminum compounds by washing the copolymer solution with a large excess of a dilute acid, such as sulfuric, hydrochloric, or acetic acid and to remove the acid by washing with water.

Alpha-olefins which can be used as comonomers in the process of the present invention can be either straight-chain or branched. Representative α-olefins include propylene, butene, pentene, hexene, heptene, decene and octadecene. Propylene is the preferred α-olefin. Nonconjugated dienes which have only one polymerizable double bond can be present in addition to α-olefin comonomers. These include 1,4-hexadiene, 5-methylene-2-norbornene, 5-(2-butenyl)-2-norbornene, dicyclopentadiene, 5-ethylidene-2-norbornene; 11-ethyl-1,11-tridecadiene, and 1,5-heptadiene.

The unsaturated functional comonomers can have active hydrogen atoms, provided at least a stoichiometric amount of aluminum alkyl or alkylaluminum halide also is present to prevent catalyst deactivation. Generally, the farther is the functional group removed from the double bond, the easier and more complete is the copolymerization of the functional comonomer. Typical compounds of the group defined by Formula I include 4-pentene-1-ol, 5-hexene-1-ol, 10-undecene-1ol, 4-pentenyl methyl ether, 5-hexenyl methyl ether, 5-hexenyl diethylamine, 6-heptenyl methylethylamine, 4-pentenyl trifluoroacetate, 6-heptenyl trifluoroacetate, 4-pentenyl methyl ketone, 5-hexenyl methyl ketone, 6-heptenyl vinyl ketone, 10-undecenyl chloride, 6-heptenyl chloride and 4-pentenyl acetate. When the unsaturated functional monomer is a member of the group defined by formula II, it can be, for example, one of the following compounds: acrylic acid, methacrylic acid, vinylacetic acid, 10-undecenoic acid, allylacetic acid, methyl acrylate, ethyl acrylate, propyl acrylate, methyl methacrylate, ethyl methacrylate, butyl 10-undecenate, ethyl vinylacetate, propyl vinylacetate, methyl allylacetate, butyl allylacetate, N,N-dimethylacrylamide, acrylamide, N,N-diethyl vinylacetamide, acrylonitrile, methacrylonitrile, 2-allylphenol, 2-methoxy-4-allylphenol, allylsulfonyl chloride and 5-norbornene-2-sulfonyl chloride. The unsaturated functional monomer can also be a 2-norbornene derivative, as shown in Formula III. It thus can be, for example, 2-norbornene-5-acetic acid, 2-norbornene-5-propionamide, 2-norbornene-5-methanol, 2-norbornene-5-ethyl methyl ketone, 2-norbornene-5-acetonitrile, or ethyl 2-norbornene-5-acetate. Monomers having structures represented by formula IV include, for example, 8-phenoxy-1,6-octadiene: 9-(2'-hydroxy)phenoxy-1,6-octadiene; 8-(4'-chloro)-phenoxy-1,6-octadiene; 8-(4'-methyl)-phenoxy-1,6-octadiene; and 8-(4'-methoxy)phenoxy-1,6-octadiene. All these compounds are known in the art.

Although the proportions of comonomers can be varied, it is preferred to maintain the amount of α-olefin (when present) at such a level that it will constitute 5–75 weight percent of the product copolymer, preferably about 20–60 weight percent. Functional unsaturated monomer is present is such an amount that it will constitute 0.1–10 mole percent of the product. When a nonconjugated diene is used in addition to ethylene and optionally α-olefin, it generally is employed at a level which will give 0.1–5 mole percent diene component in the final copolymer. The amount of ethylene can be varied within rather broad limits, so long as the above proportions are maintained.

The novel copolymers of the present invention have desirable physical and chemical properties which make them useful for a number of applications. Thus, for example, the solubility and dispersibility of an olefinic polymer are modified by the presence of functional groups. A copolymer having functional groups is more compatible with polar solvents than a hydrocarbon polymer. Carboxyl groups impart good abrasion resistance, allow formation of stable latices, and improve adhesion. Hydroxyl groups provide active sites which allow crosslinking and/or chain extension, for instance with polyisocyanates. Other functional groups, such as amino groups, improve dyeability of a copolymer. These new terpolymers and tetrapolymers are very useful in adhesives, especially when a nonpolar material must be bonded to a polar substrate (e.g., when bonding elastomer stocks to tire cords).

This invention will be better understood if reference is made to the following examples of some specific embodiments thereof, where all parts, proportions and percentages are by weight, unless otherwise indicated.

EXAMPLES

General Copolymerization Procedure for ethylene/propylene/functional monomer terpolymers Batch polymerizations are carried out at atmospheric pressure in an oven-dried 3-necked 1000-ml. flask equipped with a serum cap, a stirrer and a thermometer. The flask is swept with nitrogene and filled to the 500 ml. mark with perchloroethylene at about 15°C. Ethylene and propylene are first swept through the solvent for 10 minutes at the rate of 1 l./minute and 2 l./minute, respectively.

In a typical experiment, while ethylene and propylene are continuously introduced at the above rates, 5 ml. of a 4M solution of diethylaluminum chloride (0.02 mole) in perchloroethylene is added through the serum cap, followed, in turn, by a solution of 0.01 mole of unsaturated functional monomer in 15 ml. of perchloroethylene and 1 ml. of a 1.0 M solution of hexachloropropylene (0.001 mole) in perchloroethylene. The temperature is adjusted to 20°C. and 1 ml. of a 0.1M solution of $VCl_4$ in perchloroethylene (0.001 mole) is added.

The temperature is maintained at 20°–30°C., cooling the flask in an ice bath, as necessary. After 30 minutes, from addition of $VCl_4$, polymerizatiton is terminated by the addition of 3 ml. of isopropyl alcohol.

Workup involves removing a 100-ml. sample and adding it dropwise to 500 ml. of methanol in a blender to precipitate the polymer; the liquid is subsequently decanted. Another 500 ml. of methanol is used to wash the polymer. The isolated polymer is dried at 90°C. for at least 3 hours in a vacuum oven.

When the copolymer contains carboxylic groups, the copolymer solution can be treated with trifluoracetic acid (TFAA) to remove last traces of the catalyst. The solution (250 ml.) is mixed with 30 ml. of TFAA and allowed to stand overnight. The solid catalyst residues are filtered; and the filtrate is treated with 10 ml. of TFAA and filtered immediately. The filtrate is concentrated in a rotary vacuum evaporator and the solution washed three times with 100 ml. of water. The organic layer is further concentrated to about 100 ml. and added dropwise to 500 ml. of vigorously stirred acetone. The precipitated polymer is decanted and dried in a vacuum oven for at least 3 hours at 90°C.

The results of experiments 1–10 run both with and without hexachloropropylene (HCP) (as catalyst reactivator) are presented below in Table II.

TABLE II

| Example No. | Monomer | Yield of copolymer from 500 ml. of solution with HCP | without HCP* |
|---|---|---|---|
| 1 | 2-benzoyl-5-norbornene | 14.0 | 0.4 |
| 2 | 2-trifluoroacetylmethyl-5-norbornene | 29.2 | 1.0 |
| 3 | 2-hydroxy-5-norbornene | 42.0 | 1.5 |
| 4 | 2-aminomethyl-5-norbornene | 22.4 | 1.4 |
| 5 | 2-allylphenol | 22.0 | 7.0 |
| 6 | 2-methoxy-4-allylphenol | 24.5 | 1.5 |
| 7 | 2-cyano-5-norbornene** | 18.0 | 1.5 |
| 8 | 5-norbornene-2-acetic acid | 38.5 | 7.5 |
| 9 | Allylsulfonyl chloride | 24.0 | 16.0 |
| 10 | 2-hydroxymethyl-5-norbornene | 37.5 | 5.4 |

* Control experiments, outside the scope of this invention.
** In this experiment, 0.02 mole of ethylaluminum dichloride is used.

General Copolymerization Procedure for ethylene/propylene/ 1,4-hexadiene/functional tetrapolymers The procedure described above for the preparation of terpolymers is used with slight modifications. Ethylene and propylene are introduced into perchloroethylene at −5°C. at the rate of 1.5 l./min. The amount of diethylaluminum chloride is increased to 25 ml. (0.10 mole) and the amount of functional monomer to 0.05 mole. 1,4-Hexadiene, 12 ml. (0.10 mole) is added through the septum. The amount of 0.1M $VCl_4$ is 3 ml. (0.0003 mole), and 3 ml. of 1.0M (0.003 mole) hexachloropropylene is added at −5°C. The tetrapolymer is recovered by precipitation with 2 liters of methanol and washed with 2 liters of methanol. The copolymer is vacuum oven-dried overnight at 60°C. The results are presented in Table III.

TABLE III

| Ex. No. | Functional monomer | Copolymer yield, grams | Percent incorporation by wt. of monomer in copolymer | Unsaturation, moles/kg. |
|---|---|---|---|---|
| 11 | $CH_2=CH-(CH_2)_9OH$ | 40.1 | 2.1 | 0.69 |
| 12 | [norbornene with $-CH_2-CH=CH_2$ and $-OH$] | 32.5 | 1.5 | 0.69 |
| 13 | [norbornene with $-CH_2CO_2H$] | 40.9 | (*) | 0.47 |
| 14 | $CH_2=CH-(CH_2)_6-COOH$ | 31.8 | (*) | 0.75 |
| 15 | [norbornene with $-CH_2NH_2$] | **16.7 | 3.9 | 0.24 |
| 16 | [N-pyridyl $-CH=CH_2$] | 12.5 | 1.8 | 0.74 |
| 17 | $CH_2=CH-CH_2SO_2Cl$ | 46.1 | 0.2 | 0.68 |

* Not determined—strong C=O band evident in IR spectrum.
** 0.15 mol of diethylaluminum chloride used.

Adhesion testing of Functional Tetrapolymers "Hard" Kaolin Clay:

"Suprex" Clay, (J.M. Huber Corp., New York) is an air-floated "hard" kaolin type characterized by the following equivalent analysis: 44–46% silica, 37.5—39.5% alumina, 1.5–2% iron oxide, and 1–2% titanium dioxide by weight, the ignition loss being 13.9–14.2% by weight. This analysis does not means that the clay necessarily contains silica or alumina. The moisture content (maximum) is 1% by weight. The pH (in water) is about 4.5–5.5. This clay has a specific gravity of 2.60, a 325-mesh screen residue of 0.17% by weight, and the following particle size distribution (by weight):

> 10 μ, 0.1% 5–10 μ, 2.8% 4–5 μ, 15%; 3–4 μ, 2.3%; 2–3 μ, 3.4%; 1–2 μ, 9.0%; 0.5–1 μ, 10.0%; 0–0.5 μ, 61.9%.

Adhesion of ethylene/propylene/1,4-hexadiene/functional monomer tetrapolymers towards Suprex Clay is determined in the following manner:

The tetrapolymer (20 grams and Suprex Clay (24 grams) are compounds on a rubber mill. The compounded polymer is loaded cold into a 1°× 5° slab mold and heated at 100°C. for 3 minutes. The specimen is allowed to cool, unloaded, and the tensile strength at break $T_B$ is determined at 25°C. on an Instron machine in accordance with ASTM Method D-412-66.

The results are presented in Table IV, below:

TABLE IV

| Ex. ample No. | Functional Monomer | Unsaturation, moles/kg. | Wt. % of propylene in tetra-polymer | Inh. Visc., at 30°C.* | $T_B$ psi. |
|---|---|---|---|---|---|
| 16 | 4-Vinylpyridine | 0.75 | 25.3 | 0.98 | 510 |
| 18** | 2-Hydroxymethyl-5-norbornene | 0.17 | 33.0 | 1.45 | 210 |
| Control*** | None | 0.40 | 42.4 | 2.17 | 50 |

\* As a solution of 0.1 g. of tetrapolymer in 100 ml. of perchloroethylene
\*\* tetrapolymer made by a continuous process
\*\*\* a prior art terpolymer having 0.33 mole/kg. unsaturation, and containing the following monomer unit composition: ethylene, 52.1; propylene, 44.0; 1,4-hexadiene, 3.9. It is made in perchloroethylene in the presence of a coordination catalyst formed by premixing diisobutylaluminum chloride and VOCl$_3$. The Mooney viscosity (ML-1+4/121°C.) is about 40.

These results show that even the unvulcanized tetrapolymers give tough and strong clay-filled compositions. Tension at break is indicative both of adhesion of the tetrapolymer to the clay and of internal cohesion of the tetrapolymer itself. Comparison with a control terpolymer not containing functional groups shows the low $T_B$ value obtained for such a terpolymer.

What is claimed is:

1. An addition copolymer of (1) ethylene, (2) an α-olefin having 3–18 carbon atoms, and (3) and unsaturated functional monomer having the formula

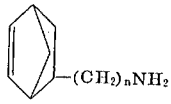

where n is an integer within the range 0–20.

* * * * *